(12) United States Patent
Garcia Ballesteros

(10) Patent No.: US 7,156,582 B2
(45) Date of Patent: Jan. 2, 2007

(54) INSPECTABLE TUNNEL FOR UNDERGROUND PIPES AND CABLES

(76) Inventor: Angel Garcia Ballesteros, La Espuela 4 - Bloque 4, 4° 2, 29016 Malaga (ES)

( * ) Notice: Subject to any disclaimer, the term of this patent is extended or adjusted under 35 U.S.C. 154(b) by 92 days.

(21) Appl. No.: 10/862,695

(22) PCT Filed: Jan. 16, 2002

(86) PCT No.: PCT/ES02/00019

§ 371 (c)(1),
(2), (4) Date: Jun. 7, 2004

(87) PCT Pub. No.: WO03/060242

PCT Pub. Date: Jul. 24, 2003

(65) Prior Publication Data

US 2005/0271475 A1    Dec. 8, 2005

(51) Int. Cl.
*E02D 29/045* (2006.01)
*E21D 9/00* (2006.01)
(52) U.S. Cl. .................... 405/132; 405/148
(58) Field of Classification Search ............. 405/132, 405/148, 272, 282, 283
See application file for complete search history.

(56) References Cited

U.S. PATENT DOCUMENTS

| | | | | |
|---|---|---|---|---|
| 3,683,467 A | * | 8/1972 | Heitzman | 425/446 |
| 4,063,432 A | * | 12/1977 | Chaussy et al. | 62/419 |
| 4,780,025 A | * | 10/1988 | Oberholzer et al. | 405/184 |
| 5,788,349 A | * | 8/1998 | DeMaine et al. | 312/223.6 |
| 6,079,720 A | * | 6/2000 | Spear et al. | 280/47.371 |
| 2004/0228710 A1 | * | 11/2004 | Ueda | 414/279 |

FOREIGN PATENT DOCUMENTS

| | | | |
|---|---|---|---|
| EP | 010547 | * | 5/2000 |
| ES | 1019281 | | 3/1992 |
| JP | 01157212 | | 6/1989 |
| JP | 01226980 | | 9/1989 |
| JP | 07095712 | * | 4/1995 |
| JP | 09084238 | | 3/1997 |

* cited by examiner

Primary Examiner—Jong-Suk (James) Lee
(74) Attorney, Agent, or Firm—John C. McMahon

(57) ABSTRACT

An inspectable tunnel comprises two opposite, vertical trays (1), whereof one is equipped with pallets (2) used to hold cables or conduits whilst the other has supports (26) whereon a plurality of hinged lids (15) can rest. The latter are connected to the pallets (2) and can have two positions; an appreciably vertical one to form an independent compartment joined to the two adjacent pallets, and the other position is appreciably horizontal and resting on the supports (26), so that the compartment thus defined is accessible from the outside.

2 Claims, 11 Drawing Sheets

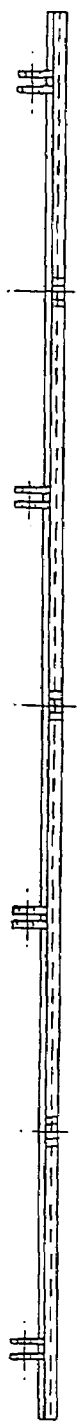
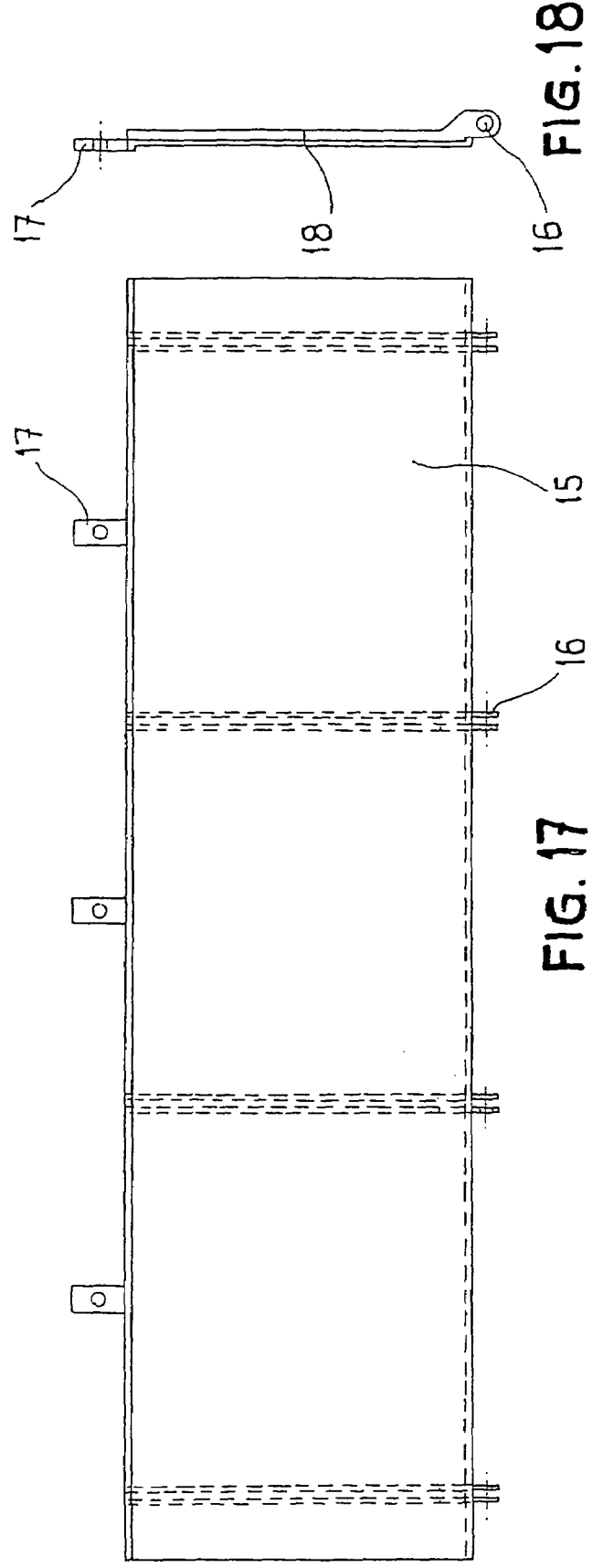
FIG. 16
FIG. 17
FIG. 18

INSPECTABLE TUNNEL FOR UNDERGROUND PIPES AND CABLES

This applications is a 371 national stage of application PCT/ES02/00019 filed Jan. 16, 2002.

BACKGROUND OF THE INVENTION

The present invention relates to an inspectable tunnel which can house the different cable installations that run through cities generally located in the pavements, forming, in this way, networks to supply the inhabitants with power, lighting, data, TV and communications in general.

At present, the objectives of the engineers, both of city councils and liberal professionals, is none other than to minimize the negative impact made on cities when it is necessary to install a new type of utility.

Although in a summarized form, it is convenient to review the different utilities required by a modern city and their characteristics with the aim of focussing the problem we are attempting to resolve.

Usually, the utilities to be considered are:
1. Sewage network, wherein normally large-sectioned pipes located in the longitudinal axis of the street or roadway are used. They are installations which are consolidated in cities and difficult to position in a utility tunnel, both for technical reasons and the high execution cost of the possible utility tunnel.
2. Drinking water supply network. Here we have a case similar to the above, worsened by the high pressure worked with and the negative effect that this would have on the other installations located in the theoretical tunnel (flooding, short circuits, etc).
3. Town gas installations. The existing safety standards make it impossible, or at least costly, to share a space with other installations, e.g. electricity.
4. Electricity. It has a negative effect on other communications installations, creating interferences, electrical noises and other problems.
5. Lighting installations. They usually cause electromagnetic noise.
6. Cable TV. Its presence does not complicate other installations.
7. Pair telephony. Its presence does not complicate other installations.
8. Fibre optic communications, its presence does not complicate other installations.
9. Internet, safety, signalling, etc. Its presence does not complicate other installations.

Any utility to be installed inevitably has to go through the following stages:
Perform a study of the networks already installed.
Analyse the existing networks to see the useful space, defining the location of the new network.
Designing and rethinking the new network.
Digging up the pavement and excavating the trench.
Fitting the network pipes.
Covering the trench.
Replacing the pavement.

Without a doubt, all or a large part of the phases described are resolved with an inspectable tunnel. Due the difficulty in execution and high cost, only in a very few occasions are the infrastructures in cities equipped with an inspectable tunnels that accommodate the different utility installations.

An inhabitant of any country is used to going out in the morning to the street to find that the pavements have been dug up, e.g. to install a new utility (currently in Spain, fibre optic for cable TV and communications) Probably the year after he/she will observe that his/her street has been again dug up to replace a power cable, etc.

There is no doubt that the world's cities have to be modernized, adapting their infrastructures to the progresses of science (telephony and communications) and to safety standards (burying the overhead electricity installations), etc. All of this is executed with one criterion, where the opportunity to invest and investor's choice of the time it will be done, predominates. This causes the constant opening of trenches, with differences in time ranging from a few months to several years. The results is none other than causing problems to the inhabitants, shopkeepers and a high fuel cost due to the traffic jams caused by this work.

SUMMARY OF THE INVENTION

An objective of the present invention is to solve this problem in a rational, profitable way, using a prefabricated inspectable tunnel:
In the case of a new residential development, permitting reducing the costs of the residential development.
In the case of an active city, making it technically possible to execute a utility tunnel that houses all the necessary installations.

The system recommended in the present invention is based on a lightweight element, manufactured in a light material, such as a compound of polyester resins reinforced with fibreglass so that, once fitted in the chosen place, the sides of the element forming the tunnel are filled with concrete, with the thickness resulting from the corresponding calculation, depending on whether it is located in the pavement or the roadway. The assembly thus installed can engage several utility installations such as power, lighting, traffic lights, TV, internet, fibre optic, etc. therein, without it being necessary to open trenches to install or modify them with the passing of time. On the contrary, it is sufficient to open the covers positioned on the upper part thereof, then introduce the corresponding conductors.

Since the assembly thus constructed permits lifting up the cover of any of the independent compartments, the operator who is working on an installation will only have to open the corresponding cover of the compartment allotted to his/her utility and when it is opened, the other compartments will remain thereunder, permitting laying the conductors on the open cover, housing them, using side pressure, in their compartment and then closing the cover. Once this operation has been performed, the general covers positioned on the upper part of the tunnel are closed thus concluding the operation. These covers can generally be coated with a non-slip paving.

The assembly thus constructed permits easily, and in a short space of time, replacing any new conductors, new operator (using a new compartment), repair of any conductor, etc).

The advantages that the system disclosed provides can be summarised in the following manner:
Occupies minimum ground space on the pavement, as all the cable installations are situated on the same vertical plane.
Saving on the investment, eliminating cable carrying pipes and minimizing the number and width of the trenches in the works to be executed.
Avoiding, in future, any new work to install a new utility, i.e.
Reduction in costs of the installation.
Reduction in social costs to businesses and inhabitants.

Elimination of the danger of accidents.

Quick execution, the reduction in operating time being in the order of 50 times less.

Reduction in costs for a new utility installation, the reduction being in the order of 50 times less than the system used in the prior art.

Given its characteristics, the system can be installed in both of the pavements of a street, avoiding the installations from crossing the roadway.

Give safety to blind people, disabled people and the elderly or handicapped, due to walking on a non-slip surface contained on the cover.

BRIEF DESCRIPTION OF THE DRAWINGS

To complement the preceding description and for the object of helping towards a better understanding of the characteristics of the invention, a detailed description of a preferred embodiment will be made, based on a set of drawings which is attached to these specifications, and wherein the following is represented with a merely illustrative, non-limiting character.

FIG. 16 shows a top view of the hinged cover.

FIG. 17 shows a top view of the hinged cover.

FIG. 18 shows a side view of the hinged cover.

DESCRIPTION OF THE ILLUSTRATED EMBODIMENTS

In said figures, the numerical references correspond to the following parts and elements.

1. Vertical tray.
2. Pallet.
3. Recesses
4. By-pass outlets.
5. Flanges.
6. Bore to fix hinged cover.
7. Female edge.
8. Male edge.
9. Upper bracing.
10. Lower bracing.
11. Rear ribs.
12. Inner pipe.
13. Outer pipe.
14. Through bores.
15. Hinged lid.
16. Rotary bore.
17. Fastening lugs.
18. Cross ribs.
19. Additional tray.
20. Lower ribs.
21. Fastening orifices.
22. Telescopic shores.
23. Upper cover.
24. Frame.
25. Hinge.
26. Cover support.
27. Dividers.

The execution of piping and cabling according to the prior art, comprises the following stages:

A study is performed on the already installed networks. evaluating their height and ground plan situation.

Figure 1:
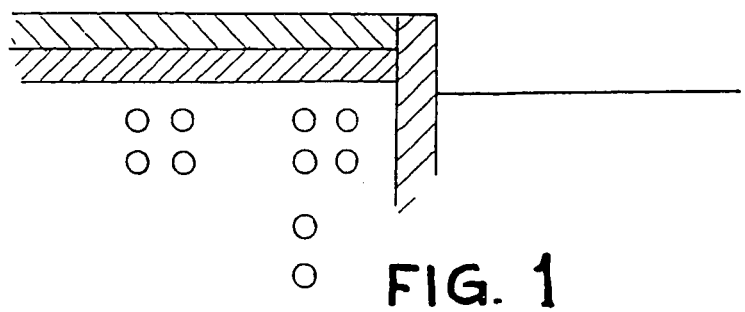
FIG. 1 shows a schematic section of an embodiment according to the prior art in the case that there is free space underneath the pavement.
Figure 2:
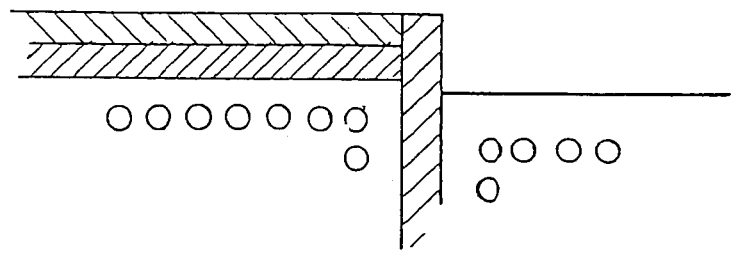
FIG. 2 shows a schematic section of an embodiment according to the prior art in the case there is no free space underneath the pavement.

After evaluating the existing networks and seeing the useful space, the location of the new networks is defined. Two cases can rise:

1. That the pavement has the capacity to house the new network which is the optimum case. See FIG. 1.
2. That the pavement does not have the capacity, with which the new network should run under the roadway or rut area, which is the most complicated case due to the difficulties caused by traffic, not only when installing it but also for maintenance work of the network in the future. See FIG. 2.

Designing and rethinking the new network, maintaining the obligatory distance from the closest installed network, both the height and side distance; e.g. is we have to install a fibre optic network for communications and the closest installation is a power transporting network, we would have to maintain a minimum distance of 15 cms between the networks, so that there are no problems with electrical noise.

Figure 3:
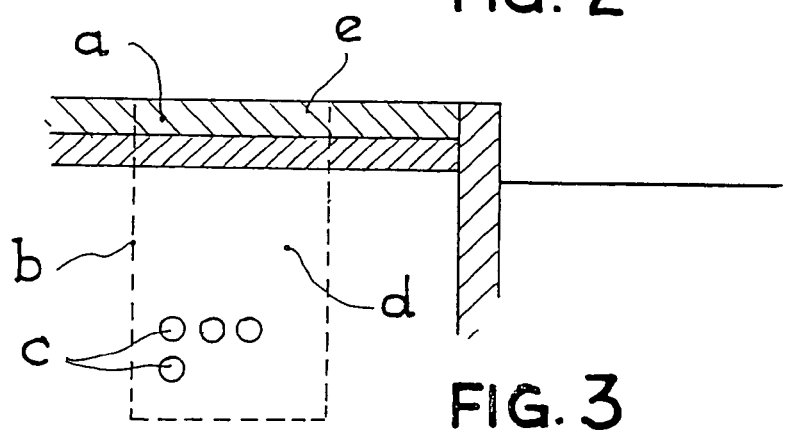
FIG. 3 shows a schematic section of an embodiment according to the prior art, wherein the different stages have been indicated.

Digging up the pavement, FIG. 3 (a) excavation of the trench, FIG. 3 (b).

Fitting the pipe or pipes to carry the network, FIG. 3 (c).

Covering the trench, with compact earth or concrete, FIG. 3 (d).

Replacing the pavement, FIG. 3 (e).

In the case of individual, non-inspectable installations, networks formed from one or more pipes of different diameters manufactured from different materials are constructed. Generally we can call these type of ducts a mono-duct as they have a single cavity or volume through which the conductors pass, normally of a single utility.

They have the following drawbacks:

The type of duct defined above, does not give it the possibility of being inspectable, i.e. its structure prevents the pipe from being opened to extract or introduce a new conductor, nor can the condition of the installation be viewed or faults be repaired.

To install a new network or utility, it is necessary to proceed as mentioned above.

An advantage one can state is that only the company which owns it can handle or have access thereto.

Figure 4:
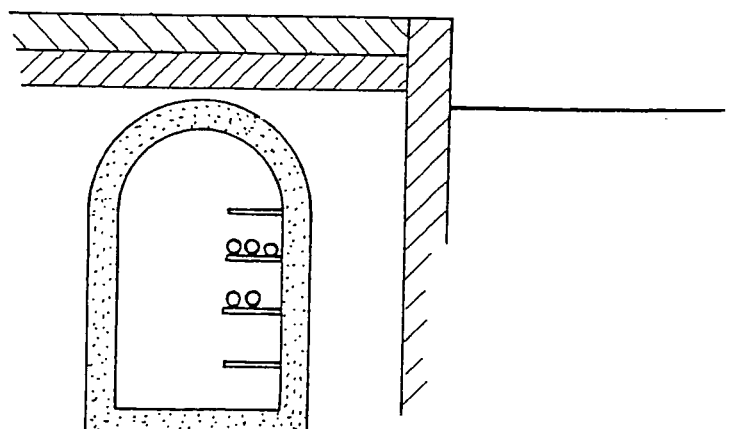
FIG. 4 shows a schematic section of an embodiment according to the prior art using a conventional utility tunnel underneath the pavement.

In the case of inspectable tunnels, networks formed from a single inspectable element, equipped with a tray that houses the different conductors corresponding to the different utilities, arranged within the common compartment, and positioned at different levels are constructed, so that each one of the different networks or installations has its designated place. The assembly can be visited as someone can go inside and it has entrances. See FIG. 4.

It has the following drawbacks:

It is very expensive to construct.

It is practically impossible to equip cities with this type of engineering and, of course, completely impossible in the old quarters thereof.

Figure 5:
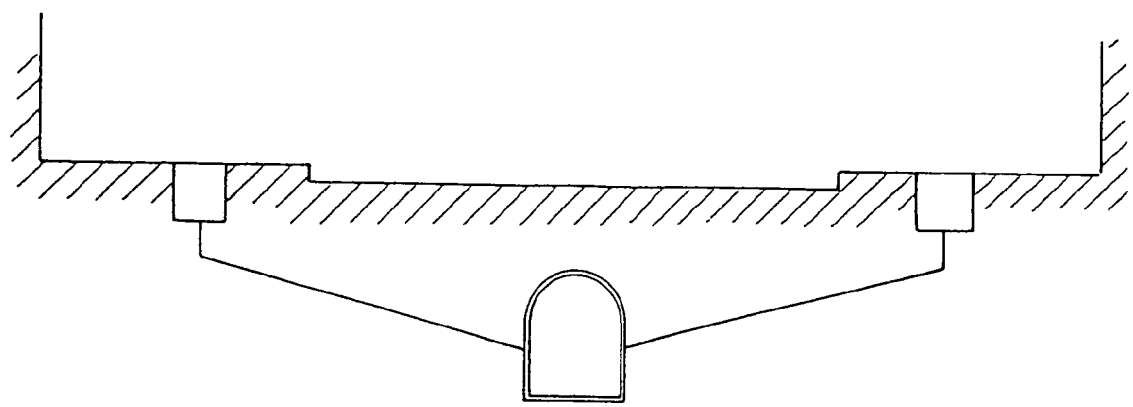
FIG. 5 shows a schematic section of an embodiment of an embodiment according to the prior art using a utility tunnel under the roadway.

Longitudinal, one way installation. This has the problem of the distribution of connections to the homes located on both sides of the street. See FIG. 5.

An advantage we can give is that the street is opened up just once, although it should be able to receive different installations or future networks.

Figure 6:
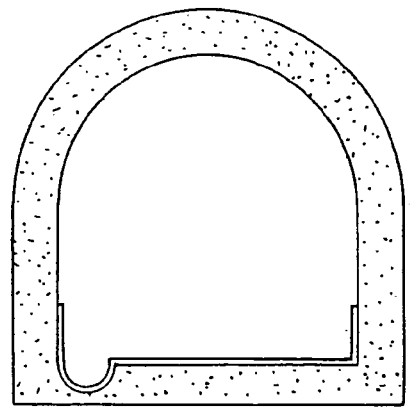
FIG. 6 shows a section of a concrete utility tunnel using conventional framing.

The tunnel can be constructed in concrete using conventional framing. See FIG. 6.

This type of construction has the drawbacks of this type of works.

High cost of construction

Long time to execute.

Poor final quality of the finish

As an advantage, we can state that it adapts to small works where it is not necessary to manufacture moulds.

Figure 7:
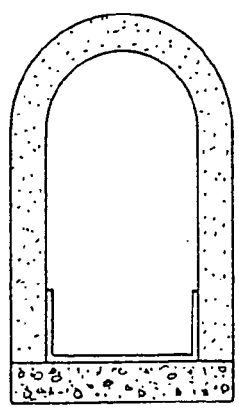
FIG. 7 shows a section of a utility tunnel executed using prefabricated contract according to the prior art.
Figure 8:
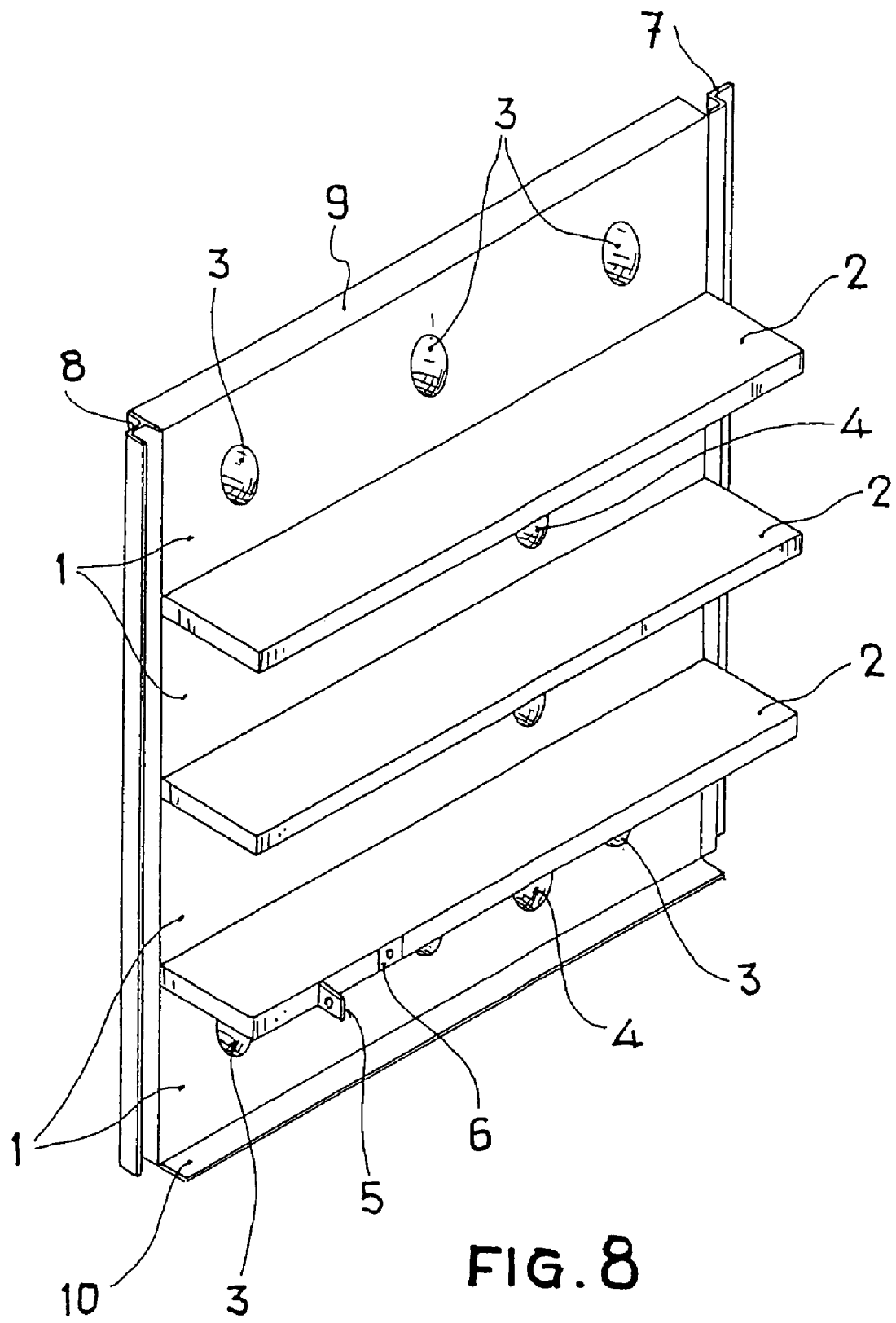
FIG. 8 shows a perspective view of the panels that form the inspectable tunnel, equipped with pallets.
Figure 11:
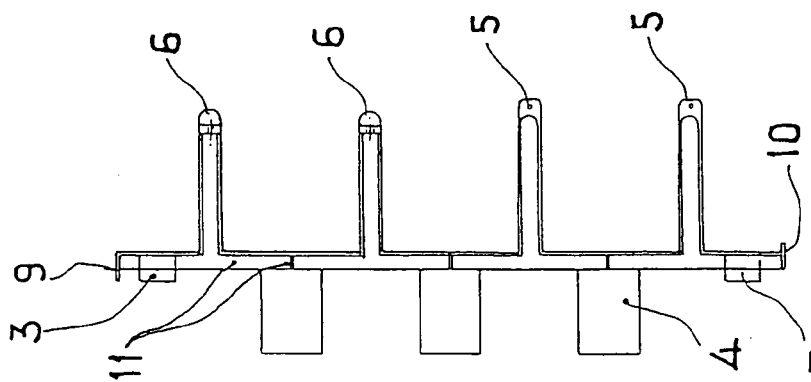
FIG. 11 shows a side view of the panel represented in FIG. 8.
Figure 10:
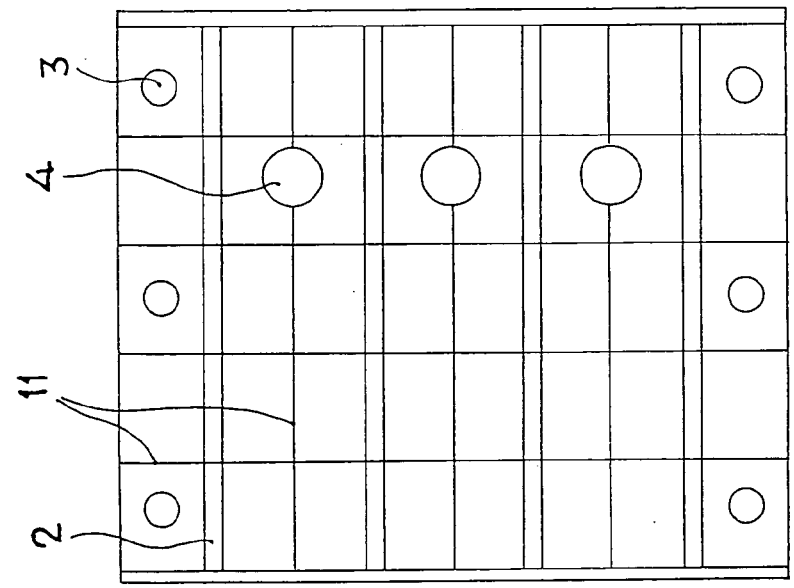
FIG. 10 shows a rear view of the panel represented in FIG. 8.
Figure 9:
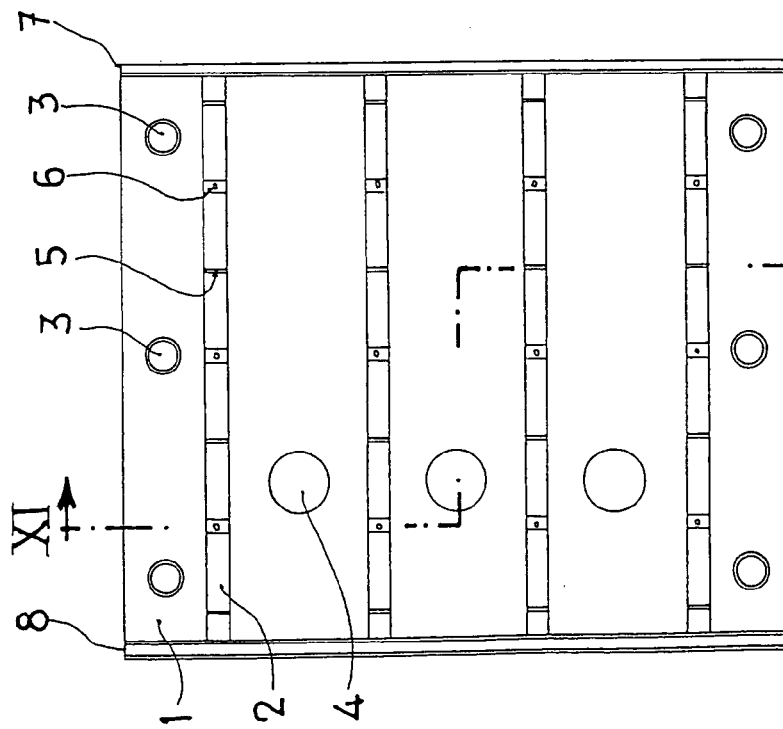
FIG. 9 shows a front view of the panel represented in FIG. 8.
Figure 12:
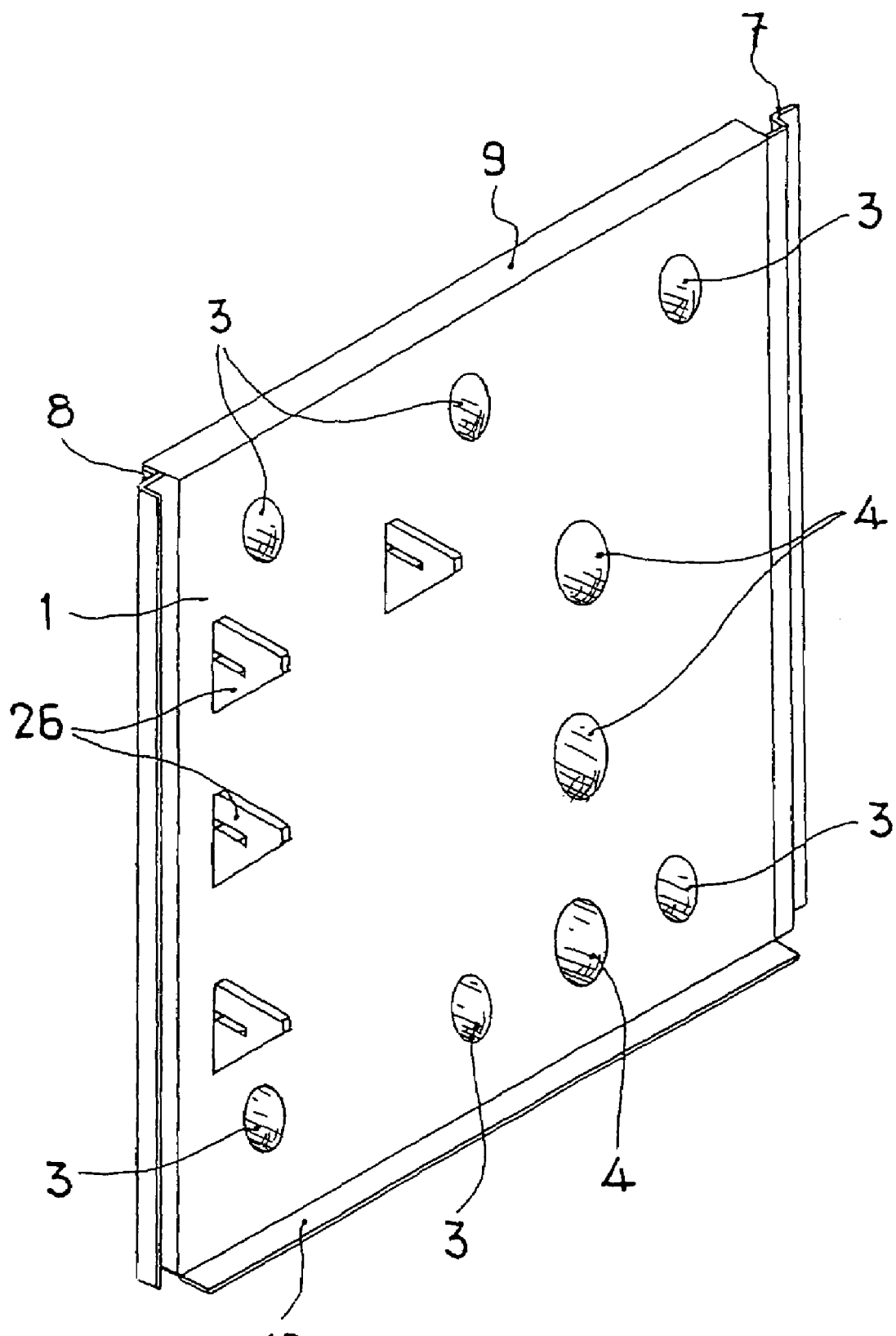
FIG. 12 shows a perspective view of one of the panels which form the inspectable tunnel, equipped with supports for the hinged covers.
Figure 15:
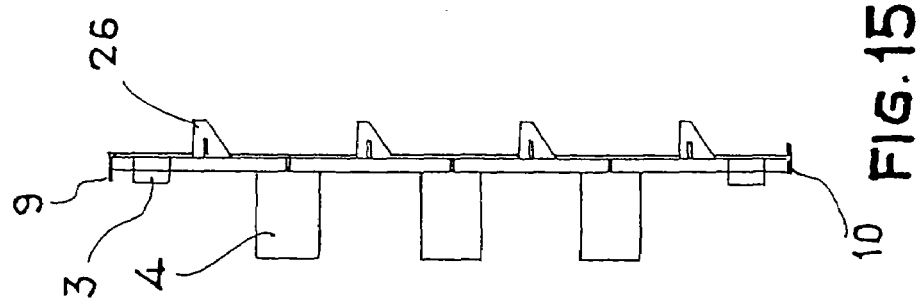
FIG. 15 shows a side view of the panel represented in FIG. 12.
Figure 14:
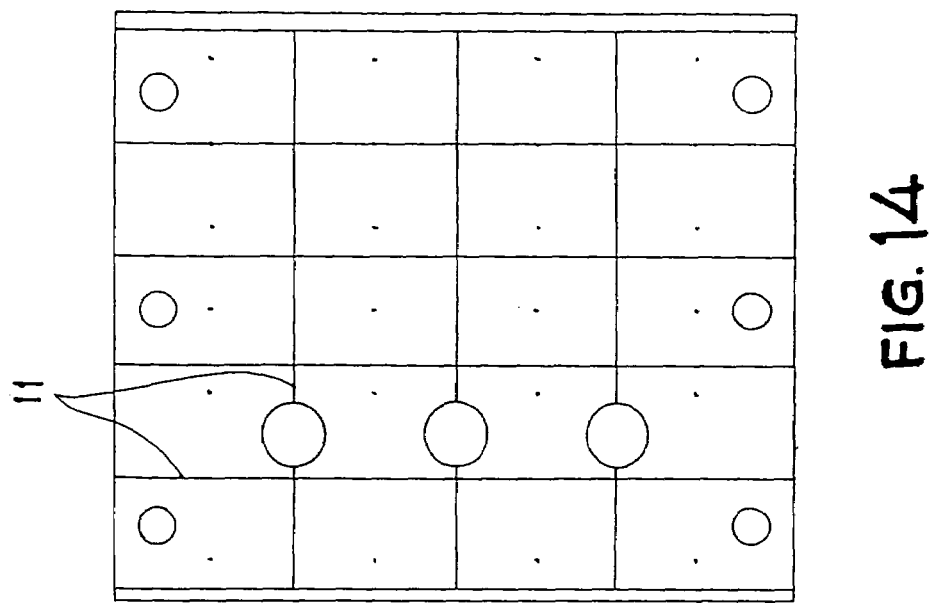
FIG. 14 shows a rear view of the panel represented in FIG. 12.
Figure 13:
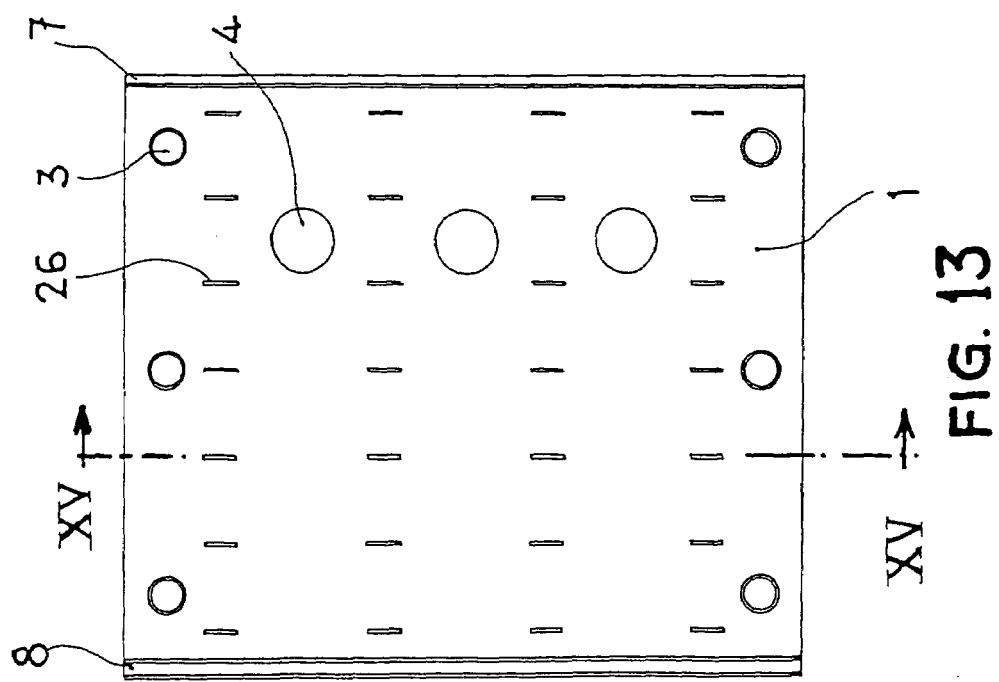
FIG. 13 shows a front view of the panel represented in FIG. 12.

We have the following drawbacks in the case of tunnels constructed with prefabricated modules. See FIG. 7.

High cost of construction

Heavy weight of the prefabricated elements.

High cost of transport

Difficult to handle and store.

An advantage is that is quicker to execute than the traditional system.

We will now go on to describe the system of construction object of the invention, in a preferred embodiment.

As can be seen in FIGS. 8, 9, 10 and 11, one of the prefabricated panels consists of a vertical tray (1) with an upper bracing (9) and a lower bracing (10), whereon a plurality of pallets (2), are arranged at intervals (2), and which has several recesses to engage the necessary bracing until the fill-concrete sets, as well as by-pass outlets (4) in the form of blind pipes with surge lines to allow the outlet of the cable. The assembly is strengthened by rear ribs (11).

The pallets (2) have connecting flanges (5) and fixing bores (6) to mount and immobilize the hinged covers (15).

The pallets (2) have connecting flanges (5) and fixing bores (6) used to mount and immobilize the hinged covers (15).

The panels can be coupled to one another by male edges (8) fitting on the female edges (7).

In FIGS. 12 to 15, we can see another embodiment of the prefabricated panels wherein the vertical tray (1) is equipped with supports (26)-instead of with pallets (2).

Figure 23:
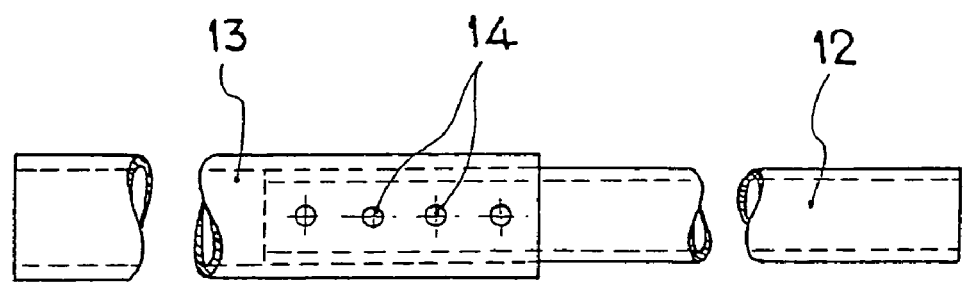
FIG. 23 shows a schematic view of the bracing pipes.

In FIG. 23, we can see the inner pipe (12) and the outer pipe (13) which forms the temporary bracing of the outer walls when being filled with concrete. The bracing width is defined by inserting a pin in the through bore (14) of both pipes (12)(13).

In FIGS. 16, 17 and 18, we can see a hinged cover (15) which has fastening lugs (17), and cross ribs (18) which end in rotary bores (16).

Figure 19:
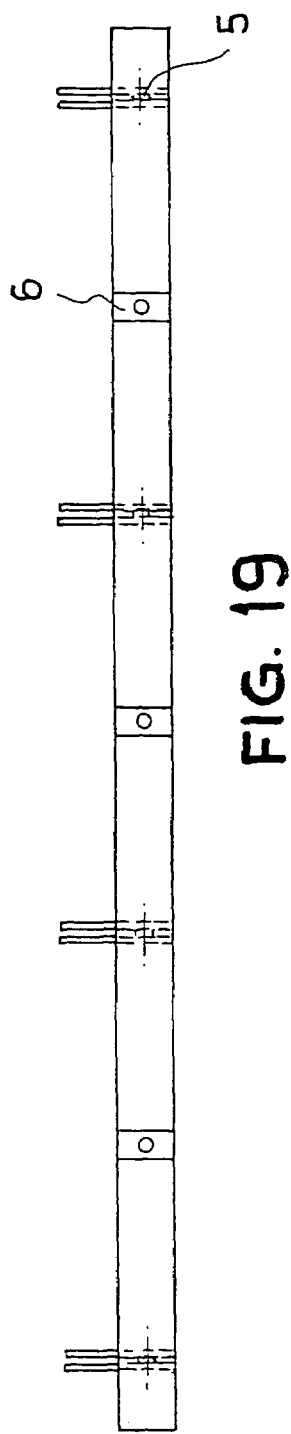
FIG. 19 shows a front view of a pallet.
Figure 20:
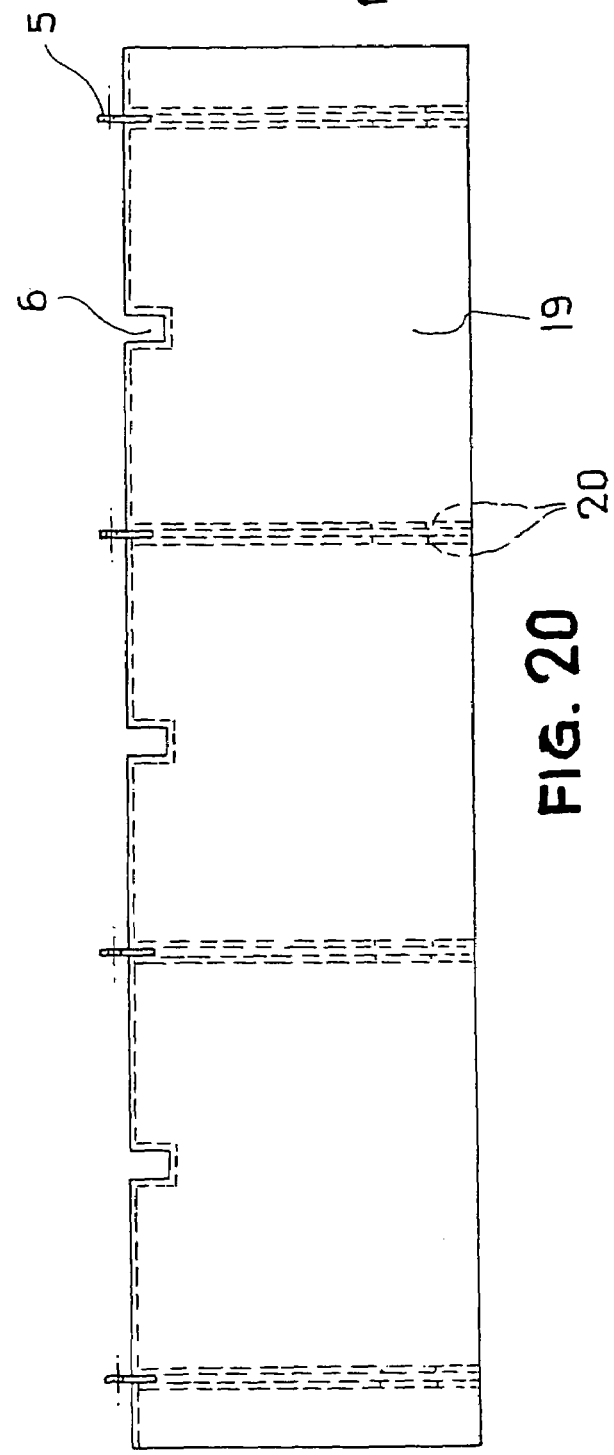
FIG. 20 shows a top view of a pallet.
Figure 21:
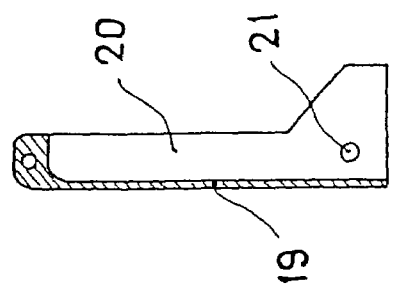
FIG. 21 shows a side view of a pallet.
Figure 22:
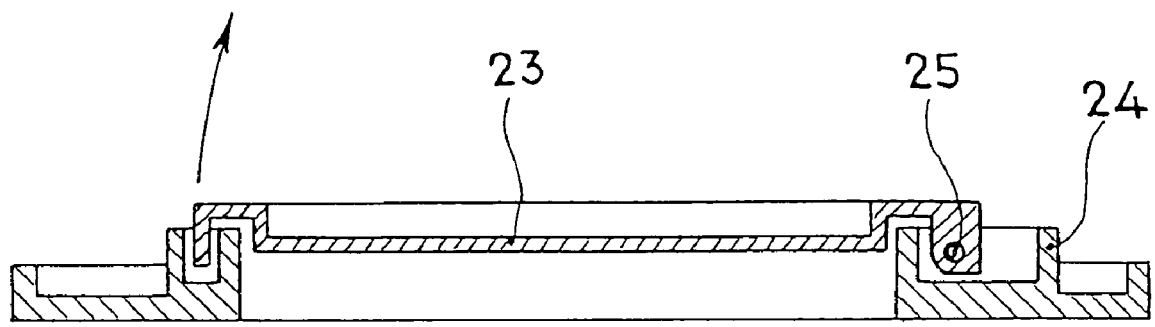
FIG. 22 shows a section of the upper cover assembly.

In FIGS. 19, 20 and 21, we can see an additional tray (19) which can be coupled to one of the panels as is shown in FIGS. 12 to 15, on the supports (26), with lower ribs (29) which incorporate, on its lower segment, connecting flanges (5) of the hinged lid and, in its rear segment, fastening orifices (21) for the supports (26).

The installation of the inspectable tunnel object of the invention is achieved by joining a panel equipped with pallets and others without, with the aid of bracing pipes laid in the chosen dimension and engaged in the recesses (3). Beforehand, the complementary elements such as covers to close the space between panels will have been installed and panels are continued to be added that are coupled at their edges. Finally, the utility tunnel is externally filled, until the level of the upper bracing (9) limit. Once the concrete has set, the telescopic shores (22) are removed and the tunnel remains completely free.

Figure 24:
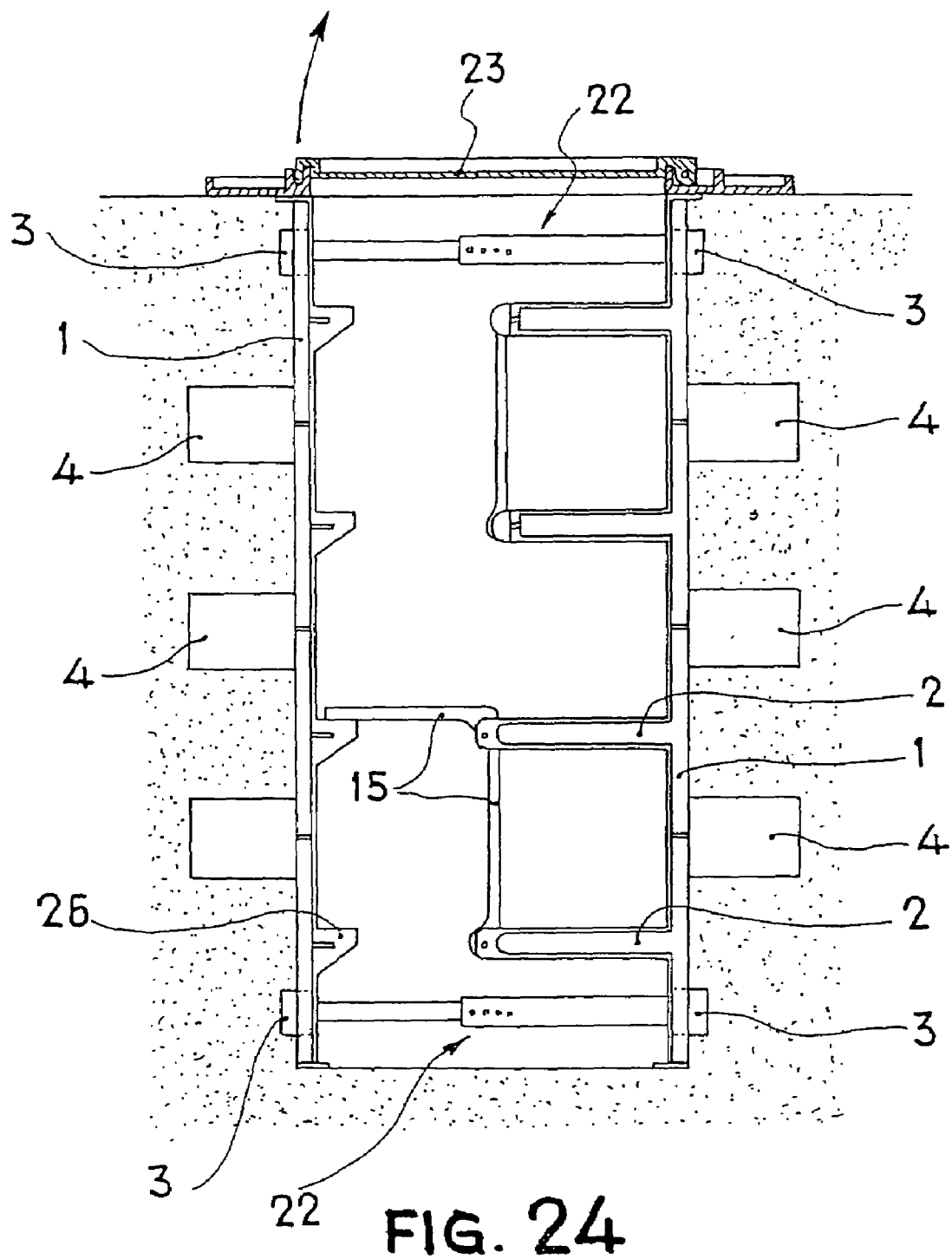
FIG. 24 shows a section of the inspectable tunnel object of the invention.

The upper covers (23) and their corresponding frames (24) are subsequently fitted at the tunnel mouth, proceeding to fill the frames with the concrete that forms the compression layer of the pavement and then the pavement finish. The upper cover (23) is joined by a hinge (25) to the corresponding frame (24), so that it permits it being opened by at least 100°, which permits us, at any time, to open all the upper covers (23) leaving the tunnel completely visible and the different compartments accessible, these being formed by the space delimited by a hinged lid (15) and two adjacent pallets (2). Each compartment can be opened by turning its hinged cover (15) until it rests on the corresponding supports (26). See FIG. 24.

The finish of the upper cover (23) can be metal, or made of construction material (similar to the pavement), or have a non-slip finish. The latter finish, installed longitudinally along the pavement, permits it to be an active element for inhabitants in the following aspects:

It helps to guide the blind. As long as they step on the non-slip material they will be on the right route, when they step on the pavement they will be on the wrong route.

It helps to avoid the elderly or disabled from falling due to slipping.

It helps the injured walk with crutches.

Figure 25:
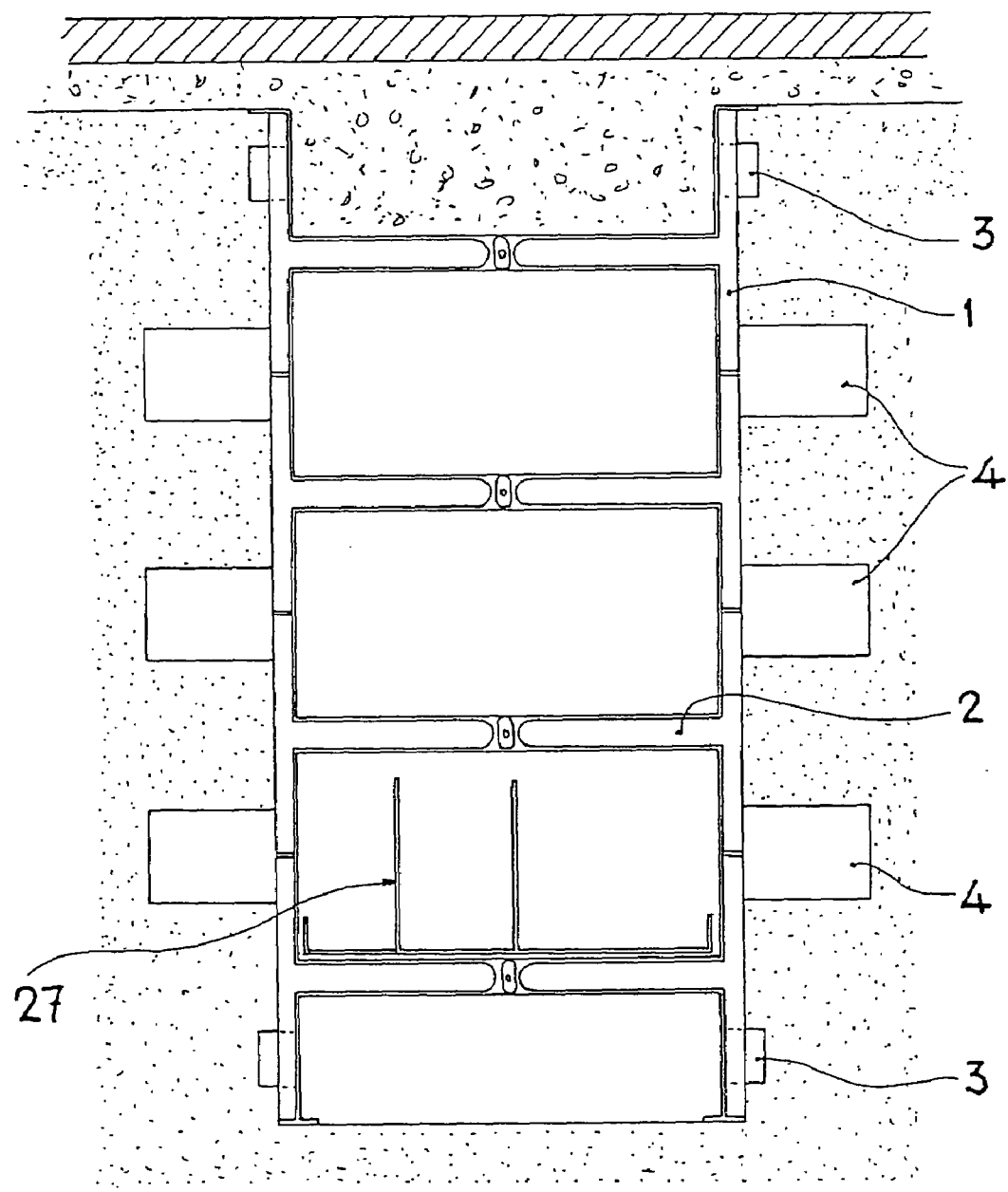
FIG. 25 shows a section of a non-inspectable embodiment using the constrictive elements of the inspectable tunnel of the invention.

It is possible that, due to the characteristics of the location of the utilities, e.g. when they run along a road, roadway or area with part of the utilities in operation, the installation of the inspectable tunnel of the type recommended is not possible, for which reason it will be obligatory to install non-inspectable buried pipes and cables. We have this same case in the historic quarters of cities. For this, the current art uses pipes which house the conductors therein, with the problems this implies, as regards the future extension of utilities or faults. The abovementioned elements which form the inspectable tunnel object of the invention likewise solve this problem (with the limitation of it not being inspectable), but due to capacity and structure permits foreseeing the implantation of a new installation without having to perform complementary works, i.e. open trenches, fit pipes, concrete, etc. There is the possibility of using two panels of the inspectable tunnels disclosed in FIG. 8, arranged in the way indicated in FIG. 25, both being joined by screws as is indicated in the drawing. The element thus formed is introduced in the trench and externally filled with concrete, having, on its upper part, a steel framework if necessary, calculated in accordance with the loads it has to bear (on the roadway) to finally proceed with the final finish.

The piping and cabling done in this manner will have sufficient spaces, reserved for different utility companies that may use them in the future and each space can even be subdivided by dividers (27) if desired.

Application PCT ES02/00019. filed Jan. 16, 2002 is fully incorporated by reference herein.

The invention claimed is:

1. An inspectable tunnel for underground pipes and cables, comprising two opposite, vertical trays (1), one of said trays being equipped with pallets (2) and a second of said trays be equipped with supports (26) used for a plurality of hinged covers. (15) to rest thereon in an open configuration; said covers being joined by flanges (5) to the pallets (2), which permits forming independent compartments with a hinged cover (15) and two adjacent pallets (2); so that each one of these compartments is accessible and independent from the others when the associated cover is in the open configuration with the associated hinged cover (15) resting on a corresponding support (26) and each compartment is closed when a respective cover is in a closed configuration; and wherein the vertical trays have recesses (3) used to engage telescopic shores (22) so that the vertical trays (1) can temporarily be maintained separate, opposite one another, until the tunnel is externally filled with concrete and this sets.

2. An inspectable tunnel for underground pipes and cables, comprising two opposite, vertical trays (1), one of said trays being equipped with pallets (2) and a second of said trays be equipped with supports (26) used for a plurality of hinged covers (15) to rest thereon in an open configuration; said covers being joined by flanges (5) to the pallets (2), which permits forming independent compartments with a hinged cover (15) and two adjacent pallets (2); so that each one of these compartments is accessible and independent from the others when the associated cover is in the open configuration with the associated hinged cover (15) resting on a corresponding support (26) and each compartment is closed when a respective cover is in a closed configuration; and wherein the vertical trays have recesses (3) used to engage telescopic shores (22) so that the vertical trays (1) can temporarily be maintained separate, opposite one another, until the tunnel is externally filled with concrete and this sets; and including the shores (22) wherein the shores (22) are formed by an inner pipe (12) which penetrates in an outer pipe (13) being immobilized by pins that go through a plurality of through bores (14).

* * * * *